United States Patent
Guruswamy et al.

(10) Patent No.: US 8,433,811 B2
(45) Date of Patent: *Apr. 30, 2013

(54) TEST DRIVEN DEPLOYMENT AND MONITORING OF HETEROGENEOUS NETWORK SYSTEMS

(75) Inventors: Kowsik Guruswamy, Sunnyvale, CA (US); James Maze, Sunnyvale, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,797

(22) Filed: Jun. 6, 2011

(65) Prior Publication Data

US 2011/0238852 A1 Sep. 29, 2011

Related U.S. Application Data

(63) Continuation of application No. 12/234,450, filed on Sep. 19, 2005, now Pat. No. 7,958,230.

(51) Int. Cl.
G06F 15/16 (2006.01)
(52) U.S. Cl.
USPC ............................ 709/230; 709/224; 715/736
(58) Field of Classification Search .................. 709/230, 709/246, 224; 715/239, 736; 714/43, 741; 712/226; 726/22; 370/249
See application file for complete search history.

(56) References Cited

U.S. PATENT DOCUMENTS

| | | | |
|---|---|---|---|
| 5,067,104 A * | 11/1991 | Krishnakumar et al. ..... | 712/226 |
| 5,185,860 A | 2/1993 | Wu | |
| 5,459,837 A | 10/1995 | Caccavale | |
| 5,485,409 A | 1/1996 | Gupta et al. | |
| 5,892,903 A | 4/1999 | Klaus | |
| 6,088,804 A | 7/2000 | Hill et al. | |
| 6,324,656 B1 | 11/2001 | Gleichauf et al. | |
| 6,363,477 B1 | 3/2002 | Fletcher et al. | |
| 6,574,737 B1 | 6/2003 | Kingsford et al. | |
| 6,584,569 B2 | 6/2003 | Reshef et al. | |
| 6,609,205 B1 | 8/2003 | Bernhard et al. | |
| 6,654,914 B1 | 11/2003 | Kaffine et al. | |

(Continued)

FOREIGN PATENT DOCUMENTS

WO 2006/099536 9/2006

OTHER PUBLICATIONS

U.S. Appl. No. 12/260,438, filed Oct. 29, 2008.
U.S. Appl. No. 11/154,636, filed Jul. 7, 2011.

(Continued)

*Primary Examiner* — Jungwon Chang
(74) *Attorney, Agent, or Firm* — Haynes, Beffel & Wolfeld LLP; Ernest J. Beffel, Jr.

(57) ABSTRACT

A test system (and corresponding method and computer program product) for generating unit tests for a heterogeneous network system and validating test results to ensure that the network system functions properly is described. In one embodiment, the test system is an appliance that is capable of normalizing communication protocols supported by component systems of the network system. The test system creates objects and methods corresponding to component systems and their supported protocol commands in the network system, and generates unit test cases based on the objects, the methods, and the normalized protocols. The test system transmits the unit test cases to the component systems, receives test results, and validates the test results to ensure that the network system functions properly.

12 Claims, 2 Drawing Sheets

U.S. PATENT DOCUMENTS

| | | | |
|---|---|---|---|
| 6,697,751 B2 | 2/2004 | Skingsley et al. | |
| 6,952,779 B1 | 10/2005 | Cohen et al. | |
| 7,152,105 B2 | 12/2006 | McClure et al. | |
| 7,159,151 B2 | 1/2007 | Morgan et al. | |
| 7,178,166 B1 | 2/2007 | Taylor et al. | |
| 7,181,769 B1 | 2/2007 | Keanini et al. | |
| 7,185,232 B1 | 2/2007 | Leavy et al. | |
| 7,243,148 B2 | 7/2007 | Keir et al. | |
| 7,257,630 B2 | 8/2007 | Cole et al. | |
| 7,272,650 B2 | 9/2007 | Elgebaly et al. | |
| 7,278,061 B2 | 10/2007 | Smith | |
| 7,290,145 B2 | 10/2007 | Falkenthros | |
| 7,315,801 B1 | 1/2008 | Dowd et al. | |
| 7,342,892 B2 | 3/2008 | Soon et al. | |
| 7,346,922 B2 | 3/2008 | Miliefsky | |
| 7,421,621 B1 | 9/2008 | Zambrana | |
| 7,447,966 B2* | 11/2008 | Kamannavar et al. | 714/741 |
| 7,451,488 B2 | 11/2008 | Cooper et al. | |
| 7,471,999 B2 | 12/2008 | Taki | |
| 7,509,675 B2 | 3/2009 | Aaron | |
| 7,512,125 B2 | 3/2009 | Betts et al. | |
| 7,536,456 B2 | 5/2009 | Williams et al. | |
| 7,536,605 B2 | 5/2009 | Keaffaber et al. | |
| 7,543,056 B2 | 6/2009 | McClure et al. | |
| 7,594,142 B1 | 9/2009 | O'Leary et al. | |
| 7,607,170 B2 | 10/2009 | Chesla | |
| 7,624,422 B2 | 11/2009 | Williams et al. | |
| 7,627,669 B2 | 12/2009 | Dugatkin et al. | |
| 7,627,891 B2 | 12/2009 | Williams et al. | |
| 7,627,900 B1 | 12/2009 | Noel et al. | |
| 7,664,845 B2 | 2/2010 | Kurtz et al. | |
| 7,673,043 B2 | 3/2010 | Keir et al. | |
| 7,774,637 B1 | 8/2010 | Beddoe et al. | |
| 7,954,161 B1 | 5/2011 | Guruswamy et al. | |
| 7,958,230 B2* | 6/2011 | Guruswamy et al. | 709/224 |
| 7,958,560 B1 | 6/2011 | Guruswamy | |
| 8,095,982 B1 | 1/2012 | Guruswamy | |
| 8,095,983 B2 | 1/2012 | Guruswamy | |
| 2001/0034847 A1 | 10/2001 | Gaul, Jr. | |
| 2002/0022952 A1 | 2/2002 | Zager | |
| 2002/0157041 A1* | 10/2002 | Bennett et al. | 714/43 |
| 2003/0009696 A1 | 1/2003 | Bunker et al. | |
| 2003/0051163 A1 | 3/2003 | Bidaud | |
| 2003/0154399 A1 | 8/2003 | Zuk et al. | |
| 2003/0159063 A1 | 8/2003 | Apfelbaum et al. | |
| 2004/0001443 A1 | 1/2004 | Soon et al. | |
| 2004/0068586 A1* | 4/2004 | Xie et al. | 709/246 |
| 2004/0068675 A1 | 4/2004 | Liu | |
| 2004/0103315 A1 | 5/2004 | Cooper et al. | |
| 2004/0205557 A1* | 10/2004 | Bahrs et al. | 715/513 |
| 2004/0230881 A1 | 11/2004 | Gwak | |
| 2005/0015213 A1 | 1/2005 | Somervill et al. | |
| 2005/0044418 A1 | 2/2005 | Miliefsky | |
| 2005/0135391 A1 | 6/2005 | Sung | |
| 2005/0144137 A1* | 6/2005 | Kumar et al. | 705/55 |
| 2005/0195820 A1 | 9/2005 | Betts et al. | |
| 2005/0248457 A1 | 11/2005 | Himberger et al. | |
| 2005/0273772 A1 | 12/2005 | Matsakis et al. | |
| 2005/0273854 A1 | 12/2005 | Chess et al. | |
| 2005/0273859 A1 | 12/2005 | Chess et al. | |
| 2006/0005231 A1 | 1/2006 | Zuk et al. | |
| 2006/0015941 A1 | 1/2006 | McKenna | |
| 2006/0015943 A1 | 1/2006 | Mahieu | |
| 2006/0021034 A1 | 1/2006 | Cook | |
| 2006/0021044 A1 | 1/2006 | Cook | |
| 2006/0021045 A1 | 1/2006 | Cook | |
| 2006/0021046 A1 | 1/2006 | Cook | |
| 2006/0021047 A1 | 1/2006 | Cook | |
| 2006/0021048 A1 | 1/2006 | Cook et al. | |
| 2006/0021049 A1 | 1/2006 | Cook | |
| 2006/0036755 A1* | 2/2006 | Abdullah et al. | 709/230 |
| 2006/0080733 A1 | 4/2006 | Khosmood et al. | |
| 2006/0085723 A1 | 4/2006 | Bartz et al. | |
| 2006/0098579 A1 | 5/2006 | Chang et al. | |
| 2006/0106939 A1 | 5/2006 | Cha et al. | |
| 2006/0137009 A1 | 6/2006 | Chesla | |
| 2006/0277606 A1 | 12/2006 | Yunus et al. | |
| 2007/0006037 A1 | 1/2007 | Sargusingh et al. | |
| 2007/0011319 A1 | 1/2007 | McClure et al. | |
| 2007/0086389 A1 | 4/2007 | Park et al. | |
| 2007/0094728 A1 | 4/2007 | Julisch et al. | |
| 2007/0115962 A1 | 5/2007 | Mammoliti et al. | |
| 2007/0174917 A1 | 7/2007 | Guruswamy | |
| 2007/0204347 A1 | 8/2007 | Caceres et al. | |
| 2008/0005555 A1 | 1/2008 | Lotem et al. | |
| 2008/0072322 A1* | 3/2008 | Guruswamy | 726/22 |
| 2008/0092237 A1 | 4/2008 | Yoon et al. | |
| 2008/0098479 A1 | 4/2008 | O'Rourke et al. | |
| 2008/0120283 A1 | 5/2008 | Liu et al. | |
| 2008/0155338 A1 | 6/2008 | Rusmanov | |
| 2008/0282352 A1 | 11/2008 | Beddoe et al. | |
| 2009/0083854 A1 | 3/2009 | Bozanich et al. | |
| 2009/0161565 A1* | 6/2009 | Reniere et al. | 370/249 |
| 2009/0172148 A1* | 7/2009 | Underwood | 709/224 |
| 2009/0271863 A1 | 10/2009 | Govindavajhala et al. | |
| 2009/0320137 A1 | 12/2009 | White et al. | |
| 2009/0328190 A1 | 12/2009 | Liu et al. | |
| 2010/0106742 A1 | 4/2010 | Guruswamy et al. | |
| 2010/0284282 A1 | 11/2010 | Golic | |
| 2010/0284283 A1 | 11/2010 | Golic et al. | |
| 2010/0293415 A1 | 11/2010 | Beddoe et al. | |

OTHER PUBLICATIONS

Wagner, D. et al., "Intrusion Detection Via Static Analysis", IEEE Symposium on Security and Privacy, 2001, pp. 156-168.

Finlay, I. et al., "Multiple Vulnerabilities in Many Implementations of the Simple Network Management Protocol (SNMP)", CERT® Advisory CA-2002-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

PROTOS Test-Suite: c06-snmpv1, University of Oulu (ee.oulu.fi)—http://www.ee.oulu.fi/research/ouspg/protos/testing/c06/snmpvl/index, Oct. 17, 2002, pp. 1-26, Finland.

PROTOS Test-Suite: c06-Idapv3, University of Oulu (ee.oulu.fi)—http://www.ee.oulu.fi/research/ouspg/protos/testing/c06/Idapv3/index.html, Dec. 2001, p. 1-13, Finland.

Beddoe, M., "Network Protocol Analysis using Bioinformatics Algorithms", 2004, retrieved on May 17, 2007, from <URL: http://www.4tphi.net/~awalters/PI/pi.pdf>.

Case, J. et al., "A Simple Network Management Protocol (SNMP)" (RFC 1157), May 1990, retrieved on May 17, 2007, from <URL: http://www.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.

Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.

Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.

Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.

Aitel, D., "An Introduction to Spike, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.

Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.

Beddoe, M., "The Protocol Informatics Project: Automating Network Protocol Analysis" (presentation slides), 2005.

Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.

Beizer, B., "Chapter 9: Syntax Testing", in Software Testing Techniques, 2nd Ed., 1990, pp. 284-319, Van Nostrand Reinhold, New York, NY.

Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.

Mu Security, "6 Degrees of Protocols", 2006.

Mu Security, "Protocol Vulnerability Patterns", Apr. 2006.

Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.

Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.

Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.

Bellovin, S. "A Technique for Counting NATted Hosts", Proceedings: Second Internet Measurement Workshop (IMW), Marseille, France, Nov. 6-8, 2002, pp. 267-272.

Bradner, S. et al., "Benchmarking Methodology for Network Interconnect Devices (RFC_1944)", May 1996, online, retrieved on May 12, 2006, from <URL: http://rfc.net/rfc1944.html>.

Bradner, S. et al., Benchmarking Methodology for Network Interconnect Devices (RFC_2544), Mar. 1999, online, retrieved on May 12, 2006, from <URL: http://rfc.net/rfc2544.html>.

CISCO Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatrav.pdf>.

Dunn, J. et. al., "Methodology for ATM Benchmarking (RFC 3116)", Jun. 2011, online, retrieved on May 12, 2006, from <URL: http://rfc.net/rfc3116.html>.

Egevang, K., et al., "The IP Network Address Translator (NAT) (RFC 1631)", May 1994, online, retrieved on May 12, 2006, from <URL: http://rfc.net/rfc3116.html>.

Microsoft Corp., "Overview of Network Address Translation (NAT) in Windows XP", Sep. 12, 2005, online, retrieved on May 12, 2006, from <URL: http://www.microsoft.com/technet/prodtechnol/winxppro/deploy/nattrnsw.mspx?pd=true>.

Netcom Systems, "SmartWindow User Guide Version 6 53", Document No. 340-1020-001 REV C, Dec. 1999, online, retrieved on May 12, 2006, from <URL: https://www.cobra.ee.ntu.edu.tw/~oops/HTML6/08_exp/smartbit%20reading.pdf>.

Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~Ijilja/cnl/pdf/milan.pdf>.

Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.

Srisuresh, P. et al., "IP Network Address Translator (NAT) Terminology and Considerations (RFC 2663)", Aug. 1999, online, retrieved on May 12, 2006, from <URL: http://rfc.net/rfc2663.html>.

Srisuresh, P. et al., "Traditional IP Network Address Translator (Traditional NAT) (RFC 3022)", Jan. 2001, online, retrieved on May 12, 2006, from <URL: http://rfc.net/rfc3022.html>.

Trend Communications, "RFC 2544 Testing with Aurora Tango", date unknown, online, retrieved on May 12, 2006, from <URL: http://www.trendtest.co.uk/trendweb/resource.nsf/vlFileURL-Lookup/en%5E%5ERFC+2544+testing/$F1LE/GbEnet.2544.test.pdf>.

Udupa, R. et al., "Performance Issues and Evaluation Techniques for Networking Devices", 2001, online, retrieved on May 12, 2006, from URL: http://softwaredioxide.com/Channels/events/testing2001/Presentations/raghavendra_infosys.pdf>.

PCT International Search Report and Written Opinion, PCT/US06/09512, Aug. 31, 2006.

Wikipedia.com, Active Directory, http://en.wikipedia.org/wiki/Tunneling_protocol.

Wikipedia.com, Active Directory, http://en.wikipedia.org/wiki/Session_initiation.

Gordano.com, What is the SMTP/EHLO clause.

Russell, et al., "The Bayeux Specification," 2007, downloaded from http://svn.cometd.com/trunk/bayeux/bayeux.html on Apr. 10, 2012.

"Session Initiation Protocol (SIP)," downloaded from http://searchunifiedcommunications.techtarget.com/definition/Session-Initiation-Protocol on Apr. 10, 2012.

"File Transfer Protocol," downloaded from http://en.wikipedia.org/wiki/List_of_FTP_commands on Apr. 10, 2012.

"List of FTP server return codes," downloaded from http://en.wikipedia.org/wiki/List_of_FTP_server_return_codes on Apr. 10, 2012.

"MGCP, Multimedia Gateway Control Protocol," downloaded from http://www.networksorcery.com/enp/protocol/mgcp.htm on Apr. 10, 2012.

U.S. Appl. No. 13/345,323 for "Analyzing the Security of Communication Protocols and Channels for a Pass Through Device", filed Jan. 6, 2012.

U.S. Appl. No. 13/345,332 for "Platform for Analyzing the Security of Communication Protocols and Channels", filed Jan. 6, 2012.

"Cisco Discovery Protocol" posted at: http://netcert.tripod.com/ccna/switches/cdp.html on May 23, 2007.

U.S. Appl. No. 11/858,779 for "Syntax-Based Security Analysis Using Dynamically Generated Test Causes", filed Sep. 20, 2007.

U.S. Appl. No. 11/745,338 for "Modification of Messages for Analyzing the Security of Communication Protocols and Channels", filed May 7, 2007.

U.S. Appl. No. 11/557,945 for "Reconfigurable Message-Delivery Proconditions for Delivering Attacks to Analyze the Security of Networked Systems", filed Nov. 8, 2006.

* cited by examiner

TEST DRIVEN DEPLOYMENT AND MONITORING OF HETEROGENEOUS NETWORK SYSTEMS

CROSS-REFERENCE TO RELATED APPLICATIONS

The present invention is related to U.S. Utility patent application Ser. No. 11/514,809, filed Sep. 1, 2006, and U.S. Utility application Ser. No. 11/760,600, filed Jun. 8, 2007, both of which are hereby incorporated by reference in their entirety.

BACKGROUND

1. Field of Art

The present invention generally relates to the field of network management, in particular to unit testing and network monitoring.

2. Description of the Related Art

With the emerging trend in real-time Internet Protocol (IP) services (e.g., Voice over IP (VoIP), Internet Protocol Television (IPTV)) and web services (e.g., Representational State Transfer (REST), Remote Procedure Call (RPC)), the integration complexity of a wide array of network/service elements has grown exponentially. These services typically are implemented by a heterogeneous network that includes a variety of interconnected heterogeneous component systems (also referred to as component systems, network/service elements). Each of the component systems serves a unique role and works together with the rest to collectively provide the aggregate service to users. For example, in VoIP, session border controllers work in conjunction with gateways, phones, billing systems, Domain Name System (DNS) servers, Remote Authentication Dial In User Service (RADIUS)/Lightweight Directory Access Protocol (LDAP) authentication servers, and underlying IP infrastructure, to constantly validate and ensure that phones can be registered, phone calls can be made, that the caller is authenticated, and that the phone calls are billed properly.

Because of the interdependent nature of the heterogeneous network, changes made in one component system (e.g., configuration changes) can inadvertently affect other component systems dependent upon it. The unintended impact can cause inter-component dependencies to breakdown and thereby break the service. In addition, because multiple component systems can share the same hosting computer resources, changes made in one component system can also impact other component systems and cause service failure. Because heterogeneous networks tend to be large in scale, the developer (or administrator) who made the changes may not be aware of these unintended consequences, even if he is also in charge of the impacted component systems.

One traditional approach to ensure that a network system functions properly involves patch management, log management, and vulnerability scanning. Patch management merely checks to see whether certain known patches have been applied without any regard to ensure that the underlying component system is working properly. Log management records what has happened in the underlying component system without revealing the actual impacts or the causes. Vulnerability scanning uses a series of checks to ensure that component systems deployed are not susceptible to known software flaws (vulnerabilities). All of these technologies are reactive in nature, and cannot ensure that the network system functions properly.

Another existing approach to ensure that a network system functions properly involves sending test messages to the system and verifying the return message. This approach may be effective in a simple network system (e.g., a website hosted by a web server). However, this approach is not suited to test and monitor more complicated heterogeneous network systems because these network systems include interconnected and interdependent heterogeneous component systems, each supporting different communication protocols. Currently there is no solution on the market that provides a single test framework that can independently verify that the heterogeneous system functions properly.

Therefore, there is a need for a system and method for ensuring that a heterogeneous network system functions properly before, during, and after a change is introduced into the system.

SUMMARY

The present invention overcomes limitations of the prior art by providing a test system (and corresponding method and computer program product) for generating unit tests for a heterogeneous network system and validating test results to ensure that the network system functions properly. In one embodiment, the test system is an appliance that is capable of normalizing communication protocols supported by component systems of the network system. The test system creates objects and methods corresponding to component systems and their supported protocol commands in the network system, and generates unit test cases based on the objects, the methods, and the normalized protocols. The test system transmits the unit test cases to the component systems, receives test results, and validates the test results to ensure that the network system functions properly.

In one aspect of the present invention, the created objects and methods are made available to users in a programming interface (e.g., Integrated Development Environment (IDE)). Users can program test cases using the objects and methods in a manner similar to traditional object-oriented programming. The method invocations are parsed using corresponding normalized protocols to generate protocol messages. The method invocations can be executed on the fly and the results can be provided to the users promptly.

In another aspect of the present invention, the test results include responding messages. The responding messages are parsed using corresponding normalized protocols to be expressed in canonical Document Object Models (DOMs). Data in the canonical DOMs can serve as (1) baseline responses for subsequent tests, and (2) parameters to other method invocations.

Other aspects of the disclosure include software, systems, components, and methods corresponding to the above, and applications of the above for other purposes.

BRIEF DESCRIPTION OF THE DRAWINGS

The disclosure is illustrated by way of example, and not by way of limitation, in the figures of the accompanying drawings in which like reference numerals refer to similar elements.

DETAILED DESCRIPTION

Figure 1:
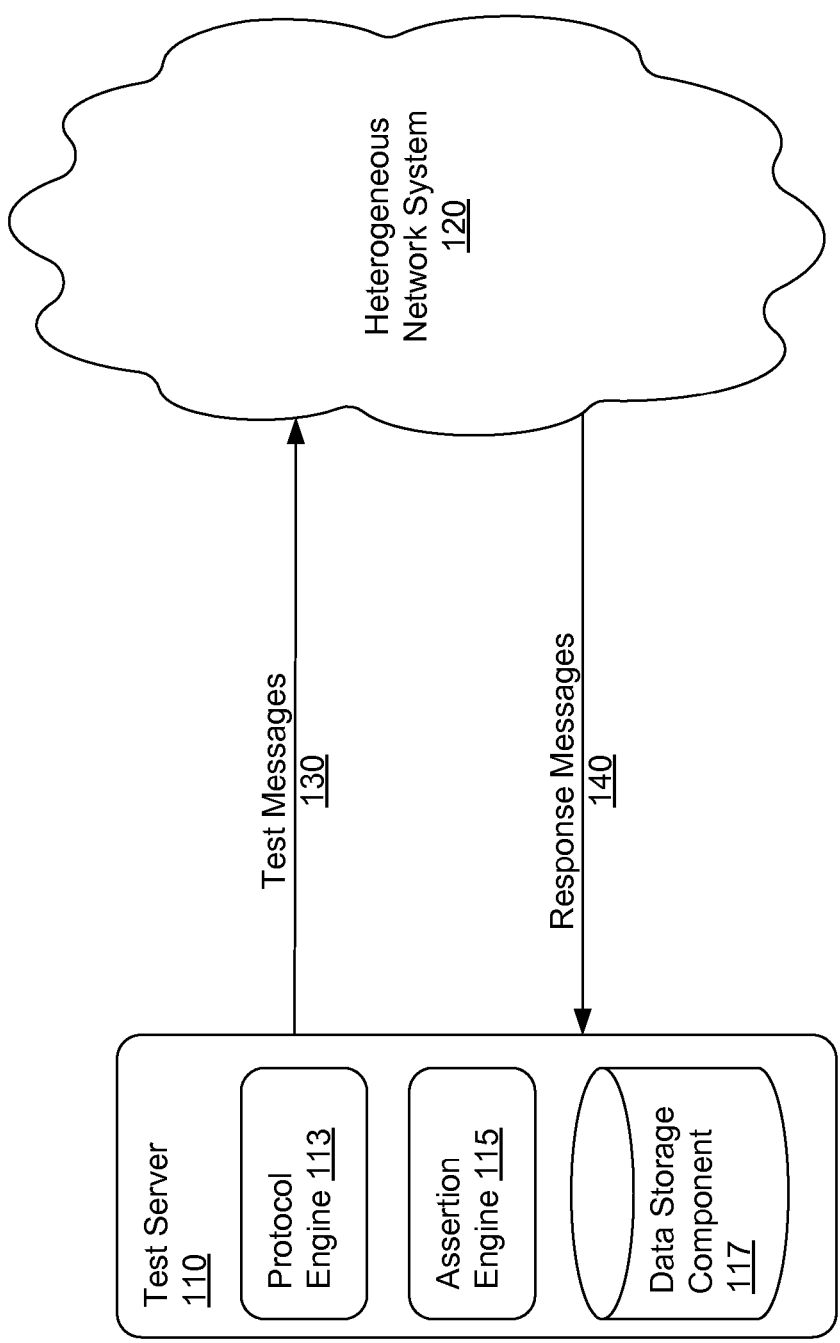
FIG. 1 illustrates a computing environment for testing a heterogeneous network system according to one embodiment of the present invention.

The present invention describes a methodology and corresponding system to test and monitor heterogeneous network systems, and to ensure that the heterogeneous network systems (and their component systems) work properly.

In one embodiment, communication protocols are normalized into protocol grammars. Component systems and their supported protocol commands are represented by objects and methods (and/or properties). The methods accept canonical arguments and return Document Object Models (DOMs) that represent the results of the method invocations. Together, these methods can be chained in arbitrary ways to program in the large. Methods related to the capabilities of component systems, their dependencies to other component systems, as well as assertions of expected canonical responses can be generated and organized as a set of unit tests. These unit tests can then be run periodically against the component systems to guarantee that their external behaviors remain unchanged due to modification or some other degradation.

Protocol Normalization

Communications among computing devices generally involve the exchange of data or messages in a known, structured format (a "protocol"). Typically a computing device supports one or more protocols by implementing them in software or hardware modules within the device. Each of these protocols can be described by a concrete formal grammar (e.g., a context-free grammar) through a process called normalization (also known as canonization). The grammar can be represented by a generic data structure using source code, and can be used to generate and verify protocol messages. Further information regarding normalization and representing protocols using source code is found in U.S. application Ser. No. 11/514,809, filed Sep. 1, 2006, the content of which is incorporated by reference in its entirety.

A protocol typically includes one or more messages (or commands). For example, in one implementation, the File Transfer Protocol (FTP) includes the following commands: ALLO command, CDUP command, CWD command, HELP command, LIST command, login attempt, MDTM command, MKD command, NLST command, PASS command, PORT command, RETR command, SMNT command, STAT command, STRU command, TYPE command, and USER command. A protocol message typically includes one or more fields. For example, in one implementation, an "INVITE" message according to the Session Initiation Protocol (SIP) includes three fields: a Universal Resource Indicator (URI) field, a version field, and a host field (IP address).

A protocol message can be expressed as a method call. Continuing with the above SIP example, the "INVITE" message can be expressed using the following method call: invite (URI, Version, IP), where the three parameters represent the actual field values. It follows that a complex network transaction can be expressed as a collection of method calls, each of which represents a protocol message involved in the transaction.

Similarly, a responding protocol message can be expressed using markup language such as the Extensible Markup Language (XML) and stored in a normalized document object model (DOM). Protocol messages can be parsed according to the corresponding protocol grammar. The parsing result can be expressed in XML and stored in the DOM.

For example, some implementations of the Secure Sockets Layer (SSL) protocol have a command for users to inquire about digital certificate information. The command can be expressed using the following method call:

certificates(target-ip)

The method call can be parsed according to the SSL protocol grammar to generate the corresponding SSL message and transmitted to the target system as identified by the method parameter. The target system returns a response message, which is parsed according to the SSL protocol grammar to generate the following canonical DOM:

```
<result>
  <certificates>
    <certificate>
      <version>2</version>
      <serial>15427896663848</serial>
      <signatureAlgorithm>
      md5WithRSAEncryption
      </signatureAlgorithm>
      <validity>
        <notBefore>06/02/2007</notBefore>
        <notAfter>06/01/2027</notAfter>
      </validity>
      <issuer>
        <country_name>--</country_name>
        <state_name>SomeState</state_name>
        <locality_name>SomeCity</locality_name>
        <organization_name>
        SomeOrganization
        </organization_name>
        <organization_unit>
        SomeOrganizationalUnit
        </organization_unit>
        <common_name>smtpedge2.uspto.gov</common_name>
        <email_address>
        support@tumbleweed.com
        </email_address>
      </issuer>
      <subject>
        <country_name>--</country_name>
        <state_name>SomeState</state_name>
        <locality_name>SomeCity</locality_name>
        <organization_name>
        SomeOrganization
        </organization_name>
        <organization_unit>
        SomeOrganizationalUnit
        </organization_unit>
        <common_name>smtpedge2.uspto.gov</common_name>
        <email_address>
        support@tumbleweed.com
        </email_address>
      </subject>
    </certificate>
  </certificates>
</result>
```

As shown, the method call returns the certificate information embedded in the responding message in a canonical DOM. As a result, it is intuitive and simple to identify in the DOM the issuer's identity (SomeOrganization), the issuer's email address (support@tumbleweed.com), and when the certificate is expiring.

It is noted that, in the above example, the complexity of the SSL protocol is hidden behind the method call and the returned canonical DOM. In addition, the SSL protocol may be implemented above several other protocol layers (see, e.g., the Open Systems Interconnection (OSI) Reference Model, which has seven layers). Details (e.g., header information) of these lower layer protocols used in actual transmission are also hidden to the user.

Concept Mapping

A heterogeneous network system typically includes interconnected computing systems (hereinafter referred to as component systems) serving a variety of roles. Multiple component systems can serve the same roles. For example, a group of servers (a cluster) can be configured to run a web application simultaneously. Component systems serving the same role are collectively called an asset. Each component system supports one or more protocols, each of which includes one or more protocol commands. Protocols supported (and services provided) by a particular component system can be found out by the rest. For example, the supported protocols (and commands) can be described using the Web Services Description Language (WSDL) in a document that is available to other component systems upon request (e.g., using Simple Object Access Protocol (SOAP)). In addition, the services provided and protocols supported by component systems can be made available through the Universal Description Discovery and Integration (UDDI). The component systems in the network system can be monitored externally (e.g., by observing their inputs and outputs), and the measured outputs can be audited to ensure that the component system works as expected.

Similarly, software developed using object-oriented programming languages (e.g., Java, Ruby) typically includes classes instantiated by objects, each of which supports one or more interfaces including one or more methods. An object can make available its supported interfaces and methods through a process called reflection. The implementation and performance of an object can be tested using approaches such as grey-box testing, and validated using assertions.

It is observed that certain concepts in network systems can be considered equivalent (or analogous) to certain concepts in object-oriented software systems. As described above, a protocol message can be expressed as a method call. Similarly, assets can be conceptually considered analogous to classes, and systems of an asset can be considered analogous to objects of the corresponding class. The following table maps concepts in network systems to their corresponding concepts in object-oriented software systems.

| Object-Oriented Software System Concepts | Heterogeneous Network System Concepts |
| --- | --- |
| Class | Asset (or Service) |
| Object (or Instance) | Component System (or Host) |
| Interface | Protocol |
| Reflection | Scan/Discovery |
| Method Invocation | Transaction/Protocol Message Exchange |
| Assertion | Audit |
| Grey-box Test | Monitor |

The following examples further illustrate the correspondence between protocol and interface, and transaction and method invocation. It is noted that parameter(s) to the methods are omitted for clarity. In one implementation, the Domain Name System (DNS) protocol has the following commands query and zoneTransfer. Correspondingly, the DNS interface has two methods, query( ) and zoneTransfer( ). Similarly, the Internet Control Message Protocol (ICMP) has command is Reachable and correspondingly the interface ICMP has function is Reachable( ). The following table is an incomplete list of communication protocols and their corresponding methods and properties.

| Protocol | Methods |
| --- | --- |
| Domain Name System (DNS) | query( ) |
|  | zoneTransfer( ) |
| Internet Control Message Protocol (ICMP) | isReachable( ) |

-continued

| Protocol | Methods |
| --- | --- |
| Lightweight Directory Access Protocol (LDAP) | enumObjectClass( ) |
|  | startTLS::certificates |
|  | startTLS::enum |
|  | startTLS::isCipherSupported |
| Mount | dump( ) |
|  | exports( ) |
| Remote Procedure Call (RPC) | enum( ) |
|  | isReachable( ) |
| Simple Mail Transfer Protocol (SMTP) | startTLS::certificates |
|  | startTLS::enum |
|  | startTLS::isCipherSupported |
| Secure Shell (SSH) | canLogin( ) |
|  | enum( ) |

When viewed this way, the traditional unit-testing paradigm can be applied to operational heterogeneous network systems by treating the component systems as a set of objects each of which has methods exposed in the form of protocol commands. The supported protocols and/or protocol commands can be discovered (e.g., through SOAP) and the assets (or services) can be obtained through means such as UDDI. Thus, the corresponding classes, objects, and methods can be constructed accordingly. These rich set of objects and methods then can be chained in numerous ways to program at large.

The performance of the heterogeneous network system can be measured and validated through monitoring communications among the component systems using supported protocols. It follows that the component systems can be tested by sending them protocol messages and validating response messages (or lack of response messages). Recall that protocol messages can be expressed as method calls, and component systems can be considered analogous to objects (or instances). Therefore, the testing protocol messages directed towards various component systems can be expressed as method invocations of corresponding objects. Recall that a protocol can be described by a grammar represented by a generic data structure using source code. The method calls can be parsed using corresponding protocol grammars to generate the testing protocol messages. Similarly, the responding messages can be parsed to be expressed in XML in DOMs. The application parsing the method calls and the responding messages is called a protocol engine.

In one embodiment, the present invention extracts information regarding interdependencies among the system components and generates testing protocol messages reflecting and testing such interdependencies. For example, a Lightweight Directory Access Protocol (LDAP) server may have one or more backup servers and/or alternate servers, based on how the service is configured. This dependency information can be retrieved from the primary LDAP server upon request. The primary LDAP server may redirect traffics to these backup/alternate servers. These redirections together form a directed graph of the component systems. Test messages can be generated to verify that the interdependencies remain valid. For example, testing protocol messages can be generated and sent to the primary LDAP server and the backup/alternate LDAP servers, and the response messages can be verified for consistency.

Computing Environment

FIG. 1 is a high-level block diagram of a computing environment 100 for testing a heterogeneous network system according to one embodiment of the present invention. The computing environment 100 includes a test server 110 and a heterogeneous network system 120 communicatively connected together. The heterogeneous network system 120 includes interconnected, interdependent, heterogeneous component systems. The test server 110 can also connect to network systems other than the heterogeneous network system 120 (not shown).

The test server 110 is configured to test and/or monitor the component systems in the heterogeneous network system 120. As shown in FIG. 1, the test server 110 includes a protocol engine 113, an assertion engine 115, and a data storage component 117. The protocol engine 113 is configured to normalize protocols supported by the component systems, to generate test messages 130 (also referred to as testing protocol messages) for component systems based on corresponding protocol grammars, and to transmit the test messages 130 to their corresponding target component systems. The protocol engine 113 is further configured to receive response messages 140 and to parse the response messages into DOMs. The test messages 130 are designed to check whether the target component systems are functioning properly. The assertion engine 115 is configured to validate (e.g., checking assertions) the DOMs generated based on the response messages 140. The assertion engine 115 ensures whether the component systems are working as expected based on the validation. The data storage component 117 is configured to store information related to the test and/or monitor of the test server 110. Examples of such information include generated test messages, assertions, normalized protocol grammars, and information about the heterogeneous network system 120 (e.g., corresponding classes, objects, interfaces, methods, and/or properties).

The test server 110, and its components 113, 115, 117 can be implemented in hardware, software, or a combination of both. Regarding software, the test server 110 can be, for example, a single application (executing within a single operating system or single physical device) or a collection of applications (e.g., one for the protocol engine 113, one for the assertion engine 115, and one for the data storage component 117, all of which executing within the same device and communicating with each other to correlate testing operations). Regarding hardware, the test server 110 can be, for example, a standalone computer or a collection of physical devices (e.g., one for the protocol engine 113, one for the assertion engine 115, and one for the data storage component 117) with out-of-band synchronization. In one embodiment, the test server 110 is a portable appliance that can be transported to different locations to test different network systems.

The heterogeneous network system 120 includes multiple interconnected component systems (not shown) that functions together. Each of the component systems includes hardware and/or software subject to test. Software includes, for example, applications, operating systems, and/or communications systems. Hardware includes, for example, one or more devices. A device can be, for example, a server, switch, bridge, router, packet filter, firewall, Virtual Private Network (VPN) concentrator, proxy, intrusion detection/prevention system, or network protocol analyzer. A component system can include multiple devices that are coupled at various communication layers to form a system or network of devices. The component systems connected to each other through networks such as the Internet, an intranet, a wireless local area network (LAN), a cellular network, or any combination thereof. The component systems receive the test messages 130 from the test server 110 and responds by sending the response messages 140.

In one embodiment, the test server 110 and component systems in the heterogeneous network system 120 are structured to include a processor, memory, storage, network interfaces, and applicable operating system and other functional software (e.g., network drivers, communication protocols).

Test Driven Methodology

Figure 2:
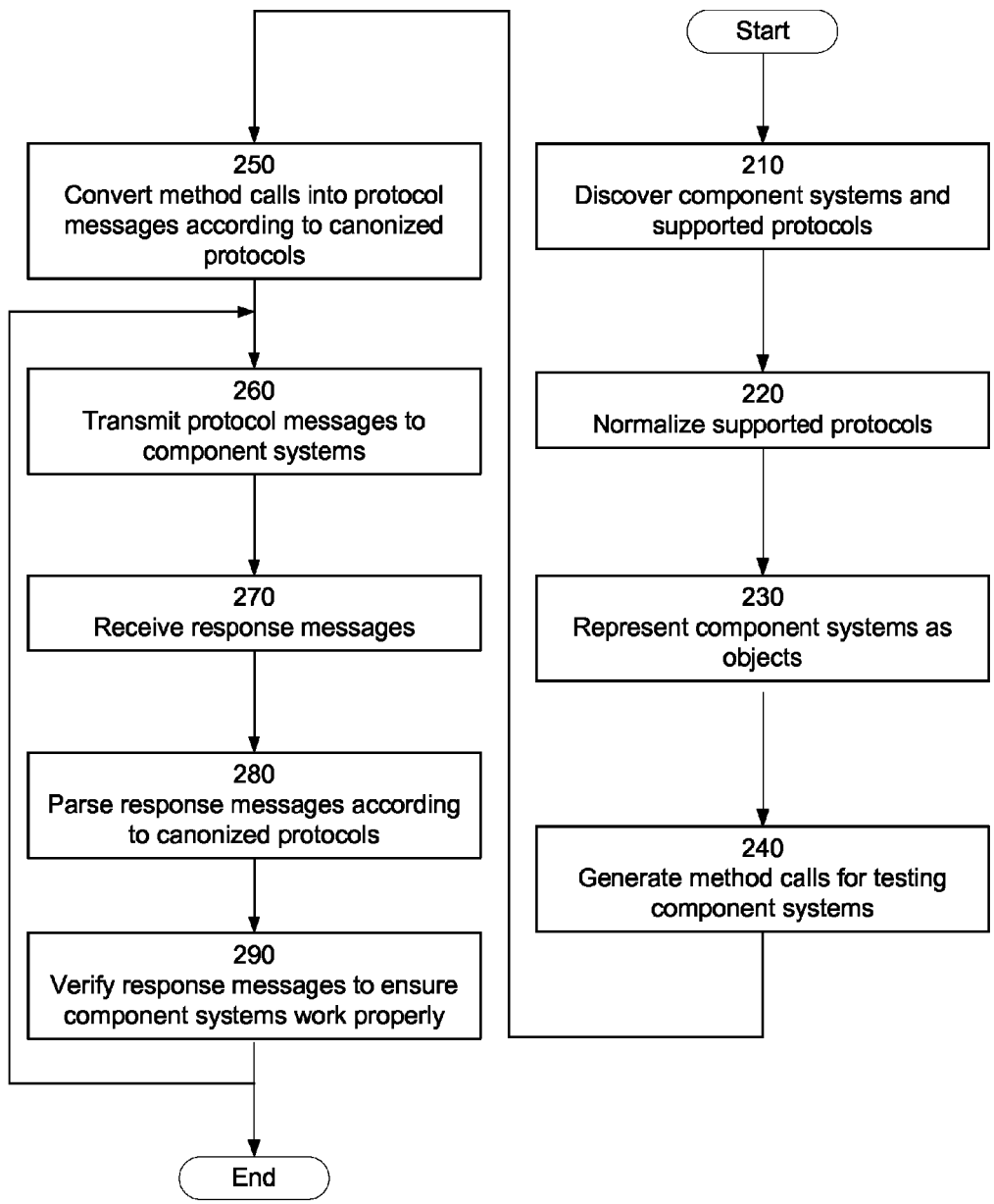
FIG. 2 illustrates a flowchart of an exemplary method of a test server shown in FIG. 1, according to one embodiment of the present invention.

FIG. 2 is a flowchart of an exemplary method 200 of the test server 110 in accordance with one embodiment of the invention. In this example, the test server 110 operates to test the heterogeneous network system 120 and determine whether its component systems function as expected. One or more portions of the method 200 may be implemented in embodiments of hardware and/or software or combinations thereof. For example, the method 200 may be embodied through instructions for performing the actions described herein and such instrumentations can be stored within a tangible computer readable medium (e.g., flash memory, RAM) and are executable by a processor. Furthermore, those of skill in the art will recognize that other embodiments can perform the steps of the method 200 in different order. Moreover, other embodiments can include different and/or additional steps than the ones described here. The test server 110 can perform multiple instances of the steps of the method 200 concurrently and/or perform steps in parallel.

The test server 110 discovers 210 component systems in the heterogeneous network system 120 and their provided services, supported protocols, protocol commands (e.g., authentication methods), and properties (e.g., certificates, ciphers supported, capabilities exposed). The test server 110 can discover such information automatically (e.g., by interacting with an active directory) or receive such information from an external source. For example, a user can provide such information to the test server 110. As another example, the test server 110 can query a DNS server in the heterogeneous network system 120 for information about web server(s) and email server(s) associated with a certain domain. The test server 110 can also inquire the component systems for their provided services and supported protocols. For example, in the context of web services, the provided services and supported protocols are explicitly published in the form of WSDL and the set of services deployed on the network system can further be obtained through UDDI. In addition, the test server 110 may discover 210 interdependencies among component systems (e.g., backup servers, alternate servers).

The test server 110 normalizes 220 the protocols supported by component systems in the heterogeneous network system 120. The test server 110 can compile the protocols directly from their specification (e.g., in External Data Representation (XDR) format). Certain classes of protocols may be already defined in machine parsable structured grammar (as described in one of the prior patents). Further information regarding normalizing a communication protocol and representing it in a generic data structure using source code is found in U.S. application Ser. No. 11/514,809, filed Sep. 1, 2006, the content of which is incorporated by reference in its entirety.

The test server 110 represents 230 the component systems in the heterogeneous network system 120 as a set of objects with methods that can be invoked and properties that can be queried based on their supported protocols and protocol commands. Recall that component systems can be conceptually considered equivalent to objects (or instances), and their supported protocol commands can be considered equivalent to methods of the corresponding objects. Therefore, the test server 110 can create objects with methods that correspond with the content systems and their supported protocol commands.

The test server 110 generates 240 method calls for testing the component systems based on the objects and methods representing the component systems. The method calls can be generated 240 based on user input. For example, a list of the objects and their interfaces, methods, and properties may be made available to the user in an IDE, and the user can selectively invoke method calls against the objects in any sequence he prefers to program a set of unit tests. For example, to test a VoIP service, the user can specify a method call to a DNS server to map a phone number into an IP address. This ensures that the IP address is reachable and more importantly the SIP (Session Initiation Protocol) is configured properly (by correlating the phone number in the SIP protocol against the DNS server). The user can then specify a method call to the RADIUS server to test authentication. Thus the user can program a unit test case for testing a complex network transaction that involves multiple heterogeneous component systems. Alternatively, the method calls can be retrieved from external sources, or automatically generated based on traffic monitored between the component systems.

The test server 110 converts 250 the method calls into corresponding protocol messages using the applicable protocol grammars, and transmits 260 the protocol messages to the target component systems. It is noted that a method call may corresponds to one or more protocol messages.

The test server 110 receives 270 responding messages from the component systems, parses 280 them according to the applicable protocol grammar, and stores the results in DOMs.

The test server 110 verifies 290 the responding messages to ensure that the component systems are working properly. The test server 110 can compare information in a responding message with a standard value (e.g., a value previously returned by the underlying component system responding to the same testing protocol message). The test server 110 can also evaluate the factors other than the responding message content to determine the performance of the component system. For example, the test server 110 can measure the response time for the transaction to determine service degradation. Further information regarding characterizing device performance is found in U.S. application Ser. No. 11/760, 600, filed Jun. 8, 2007, the content of which is incorporated by reference in its entirety.

The test server 110 can record the generated method calls and periodically invoke them to test the heterogeneous network system 120. Thus the test server 110 can detect changes in system behavior, either configuration or service degradation in the form of failing the verification 290 on an on-going basis. Alternatively, the test server 110 can use the results of the method calls as baseline responses for subsequent tests.

User Interface

The principles described herein can be further illustrated through the following example in accordance with one embodiment of the invention. In this example, the test server 110 tests a DNS server in the heterogeneous network system 120. The DNS server is represented 230 as an object named DNS. The object has the following method:

DNS.query(target-ip, query-name, query-type, query-class)

The represented object and method can be made available to a user (e.g., an Information Technology professional) in a user interface similar to an Integrated Development Environment listing classes and their members. The user can visually drag-and-drop methods into programming window to program unit test cases. For example, the user can instruct the test server 110 to invoke the DNS.query( ) method for information about the uspto.gov domain. The test server 110 in turn converts 250 the method into corresponding protocol message, and transmits 260 the protocol message to the DNS server. The test server 110 receives 270 the responding message, parses 280 it, and present the parsed result to the user as shown below.

```
<result>
    <status>NOERR</status>
    <answers>
        <a>
            <label type='domain'>uspto.gov</label>
            <value type='ip'>151.207.245.67</value>
        </a>
    </answers>
    <authorities>
        <ns>
            <label type='domain'>uspto.gov</label>
            <value type='domain'>dns1.uspto.gov</value>
        </ns>
        <ns>
            <label type='domain'>uspto.gov</label>
            <value type='domain'>dns2.uspto.gov</value>
        </ns>
    </authorities>
    <additional>
        <a>
            <label type='domain'>dns1.uspto.gov</label>
            <value type='ip'>151.207.240.50</value>
        </a>
        <a>
            <label type='domain'>dns2.uspto.gov</label>
            <value type='ip'>151.207.246.51</value>
        </a>
    </additional>
</result>
```

As shown, the DNS server returns a set of IP addresses associated with the uspto.gov domain. This result can serve as a baseline for future test result comparison and as indications of internal performance against certain measures. For example, the user can choose to make assertions for this test message by visually placing pushpins onto the values the user wants to verify. The user can also specify criteria such as acceptable value ranges. When the method (or corresponding protocol message) is subsequently invoked, the result is validated using these assertions.

In addition, the user can also utilize (e.g., cut-and-paste) values in the result to generate other method calls. For example, the user can use the IP address in the result (151.207.245.67) to make inquiries to the web server for the uspto.gov domain.

Alternative Embodiments

The above embodiments and examples show that the present invention can be used to test and monitor live network systems. The present invention can also be used in deploying network systems in a manner similar to the Test-Driven Development for software development. For example, the present invention can be utilized to progressively deploy a network system in the following manner: (1) add unit tests to ensure that they fail; (2) deploy some component systems against these unit tests; (3) run the automated unit tests to make sure they pass; (4) deploy new or make changes to existing component systems; (5) verify that the automated unit tests continue to pass. This approach ensures that the impact of changes can be clearly identified and allows the Information Technology (IT) organization to deploy the network system rapidly while keeping the quality levels high. The unit tests ascertain that the changes do not break anything and that the network system works as expected. More importantly, the unit tests serve as a baseline for the expected behavior and any changes in this behavior due to either configuration changes or implementation changes can be clearly identified. The unit tests can run periodically to ensure the ongoing integrity of the network system.

The unit tests might rely on standard unit testing frameworks like JUnit (for Java) or RUnit (for Ruby) using the classic setup/test/teardown metaphors. The queries are not necessarily restricted to just component systems, but also the network system at large. For example, to test a security policy that prohibits traffic between two networks, the test server 110 can connect to both networks, and generate a valid transaction from the two networks and assert that it is not possible.

The present invention has the following advantages. The present invention thoroughly tests component systems to ensure that when they are deployed, they will work together as designed to perform a specific function in the environment within acceptable thresholds. In addition, when changes are made to the component systems, the present invention ensures that the function or service remains operational within acceptable thresholds, or identifies the impacts or degradations such that the IT organization can restore the function or service in a timely fashion. Also, those responsible for ensuring the security of the environment can validate the change against approved baseline standards, and mark any deviations from the baseline for remediation efforts. Because the test messages extract information directly from the component systems (as opposed to parsing log files), any behavior changes are directly visible in the exposed interface of the component system. The present invention can also validate interdependencies among component systems to ensure that they are continuing to work and that they are not changing since the last time unit tests were run. These unit tests in essence embody a positive model of how the service should be behaving.

In the preceding description, for purposes of explanation, numerous specific details are set forth in order to provide a thorough understanding of the disclosure. It will be apparent, however, to one skilled in the art that the disclosure can be practiced without these specific details. In other instances, structures and devices are shown in block diagram form in order to avoid obscuring the disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, objects, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present disclosure also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems appears in the description herein. In addition, the present disclosure is not described with reference to any particular programming language. It will be appreciated that a variety of programming languages may be used to implement the teachings of the disclosure as described herein.

What is claimed is:

1. A method for testing a heterogeneous network including a plurality of interconnected component systems, each component system supporting one or more communication protocols, the method comprising:

normalizing communication protocols supported by the plurality of component systems into corresponding protocol grammars;

after the normalizing, representing the plurality of component systems as a set of objects with methods corresponding to supported protocol commands;

after the representing, generating a unit test for the heterogeneous system comprising a collection of method calls that correspond with a series of interactions among the plurality of component systems;

after generating the unit test, converting the collection of method calls into test protocol messages based on the corresponding protocol grammars;

after the converting, transmitting the test protocol messages to the plurality of component systems;

monitoring returning messages received from the plurality of component systems in response to the test protocol messages; and determining whether the heterogeneous network functions properly based on the returning messages received from the plurality of component systems.

2. The method of claim 1, wherein the set of objects with methods are displayed in an Integrated Development Environment, and a user can program the collection of method calls using the set of objects and methods.

3. The method of claim 1, further comprising:

prior to the steps of normalizing and representing, discovering the plurality of component systems and their supported communication protocols and protocol commands by sending messages to component systems and observing responses to those messages.

4. The method of claim 1, further comprising adding assertions into the returning messages to validate future returning messages.

5. A computer program product having a non-transitory computer-readable medium having computer program instructions recorded thereon for testing a heterogeneous network including a plurality of interconnected component systems, each supporting one or more communication protocols, the computer program instruction comprising instructions for:

normalizing communication protocols supported by the plurality of component systems into corresponding protocol grammars;

representing the plurality of component systems as a set of objects with methods corresponding to supported protocol commands;

generating a unit test for the heterogeneous system comprising a collection of method calls that correspond with a series of interactions among the plurality of component systems;

converting the collection of method calls into test protocol messages based on the corresponding protocol grammars;

transmitting the test protocol messages to the plurality of component systems;

monitoring returning messages received from the plurality of component systems in response to the test protocol messages; and determining whether the heterogeneous network functions properly based on the returning messages received from the plurality of component systems.

6. The computer program produce of claim 5, wherein the set of objects with methods are displayed in an Integrated Development Environment, and a user can program the collection of method calls using the set of objects and methods.

7. The computer program product of claim 5, wherein the computer program instructions further comprise instructions for:

prior the normalizing and representing, discovering the plurality of component systems and their supported communication protocols and protocol commands by sending messages to component systems and observing responses to those messages.

8. The computer program product of claim 5, wherein the computer program instructions further comprise instructions for:

adding assertions into the returning messages to validate future returning messages.

9. An apparatus for testing a heterogeneous network including a plurality of interconnected component systems, each supporting one or more communication protocols, the apparatus comprising:

a protocol engine configured to normalize communication protocols supported by the plurality of component systems into corresponding protocol grammars, represent the plurality of component systems as a set of objects with methods corresponding to supported protocol commands, generate a unit test for the heterogeneous system comprising a collection of method calls that correspond with a series of interactions among the plurality of component systems, convert the collection of method calls into test protocol messages based on the corresponding protocol grammars, and transmit the test protocol messages to the plurality of component systems;

an assertion engine configured to determine whether the heterogeneous network function properly based on returning messages received from the plurality of component systems in response to the test protocol messages; and a data store configured to store the protocol grammars, the set of objects with methods, and the collection of method calls.

10. A method for testing a heterogeneous network including a plurality of interconnected component systems, each component system supporting one or more communication protocols, the method comprising:

normalizing communication protocols supported by the plurality of component systems into corresponding protocol grammars;

representing the plurality of component systems as a set of objects with methods corresponding to supported protocol commands;

generating a unit test for the heterogeneous system comprising a collection of method calls that correspond with a series of interactions among the plurality of component systems;

converting the collection of method calls into test protocol messages based on the corresponding protocol grammars;

transmitting the test protocol messages to the plurality of component systems;

monitoring returning messages received from the plurality of component systems in response to the test protocol messages;

determining whether the heterogeneous network functions properly based on the returning messages received from the plurality of component systems;

extracting information regarding interdependencies among the system components;

generating test messages that verify that the interdependencies remain valid;

sending the test messages;

observing the responses to the test messages; and verifying the interdependencies remain valid among the system components based on the responses to the test messages.

11. A computer program product having a non-transitory computer-readable medium having computer program instructions recorded thereon for testing a heterogeneous network including a plurality of interconnected component systems, each supporting one or more communication protocols, the computer program instruction comprising instructions for:

normalizing communication protocols supported by the plurality of component systems into corresponding protocol grammars;

representing the plurality of component systems as a set of objects with methods corresponding to supported protocol commands;

generating a unit test for the heterogeneous system comprising a collection of method calls that correspond with a series of interactions among the plurality of component systems;

converting the collection of method calls into test protocol messages based on the corresponding protocol grammars;

transmitting the test protocol messages to the plurality of component systems;

monitoring returning messages received from the plurality of component systems in response to the test protocol messages;

determining whether the heterogeneous network functions properly based on the returning messages received from the plurality of component systems;

extracting information regarding interdependencies among the system components;

generating test messages that verify that the interdependencies remain valid;

sending the test messages;

observing the responses to the test messages; and verifying the interdependencies remain valid among the system components based on the responses to the test messages.

12. An apparatus for testing a heterogeneous network including a plurality of interconnected component systems, each supporting one or more communication protocols, the apparatus comprising:

a protocol engine configured to normalize communication protocols supported by the plurality of component systems into corresponding protocol grammars, represent the plurality of component systems as a set of objects with methods corresponding to supported protocol commands, generate a unit test for the heterogeneous system comprising a collection of method calls that correspond with a series of interactions among the plurality of component systems, convert the collection of method calls into test protocol messages based on the corresponding protocol grammars, and transmit the test protocol messages to the plurality of component systems;

an assertion engine configured to determine whether the heterogeneous network functions properly based on returning messages received from the plurality of component systems in response to the test protocol messages; and a data store configured to store the protocol grammars, the set of objects with methods, and the collection of method calls, wherein the protocol engine is further configured to extract information regarding the interdepedencies among the system components, and is configured to generate test messages that verify that the interdependencies remain valid, and to transmit the test messages that verify that the interdependencies remain valid, and wherein the assertion engine is further configured to determine, based on returning responses to the test messages, that the interdependencies remain valid among the system components.

* * * * *